United States Patent [19]
Athy, Jr. et al.

[11] 3,788,341
[45] Jan. 29, 1974

[54] PRESSURE RESPONSIVE VALVE SYSTEM

[75] Inventors: Lawrence P. Athy, Jr.; Sandy S. Rushing, Jr.; Gordon B. Nicholson, III, all of Houston, Tex.

[73] Assignee: Southwestern Manufacturing Company

[22] Filed: May 4, 1972

[21] Appl. No.: 250,215

[52] U.S. Cl................................. 137/209, 137/488
[51] Int. Cl............................................ F16k 31/12
[58] Field of Search........................... 137/209, 488

[56] References Cited
UNITED STATES PATENTS

| | | |
|---|---|---|
| 3,227,171 | 1/1966 | Woelfel........................ 137/488 X |
| 2,203,243 | 6/1940 | Wettstein........................... 137/488 |
| 3,367,355 | 2/1968 | Anderson........................... 137/209 |
| 3,467,129 | 9/1969 | Gratzmuller.................... 137/209 X |
| 2,132,132 | 10/1938 | Seat..................................... 137/209 |

*Primary Examiner*—Harold W. Weakley
*Attorney, Agent, or Firm*—Pravel, Wilson & Matthews

[57] ABSTRACT

A new and improved system for controlling the operation of a valve, particularly adapted for use in remote locations such as remote pipeline block valves and the like.

10 Claims, 2 Drawing Figures

PRESSURE RESPONSIVE VALVE SYSTEM

BACKGROUND OF THE INVENTION

1. Field of Invention

The present invention relates to systems for actuating valves and the like.

2. Description of Prior Art

Pipeline block valves commonly have had valves which were to be shut or closed in the event of a pipeline break, for safety and ecology purposes. Operating power was required for these safety valves. It has been undesirable for ecological reasons and for safety reasons to use the product in the pipeline as a source for the operating power, since the product was released into the atmosphere when so used. Also, since the valves were often located in remote areas, the expense of providing electrical power lines to the stations was often prohibitive. Further, malfunction of equipment at the block valve often went undetected.

SUMMARY OF INVENTION

Briefly, the present invention provides a new and improved system for operating a valve when an abnormal condition occurs in a fluid conduit system. A pressure responsive sensing valve senses the abnormal condition in the pipe system and a control valve responsive to the sensing valve permits power from a self-contained fluid pressure power supply to energize a valve actuator. The actuator then operates the valve, causing the valve to open or close in response to the abnormal condition.

DESCRIPTION OF THE PREFERRED EMBODIMENT

Figure 1:
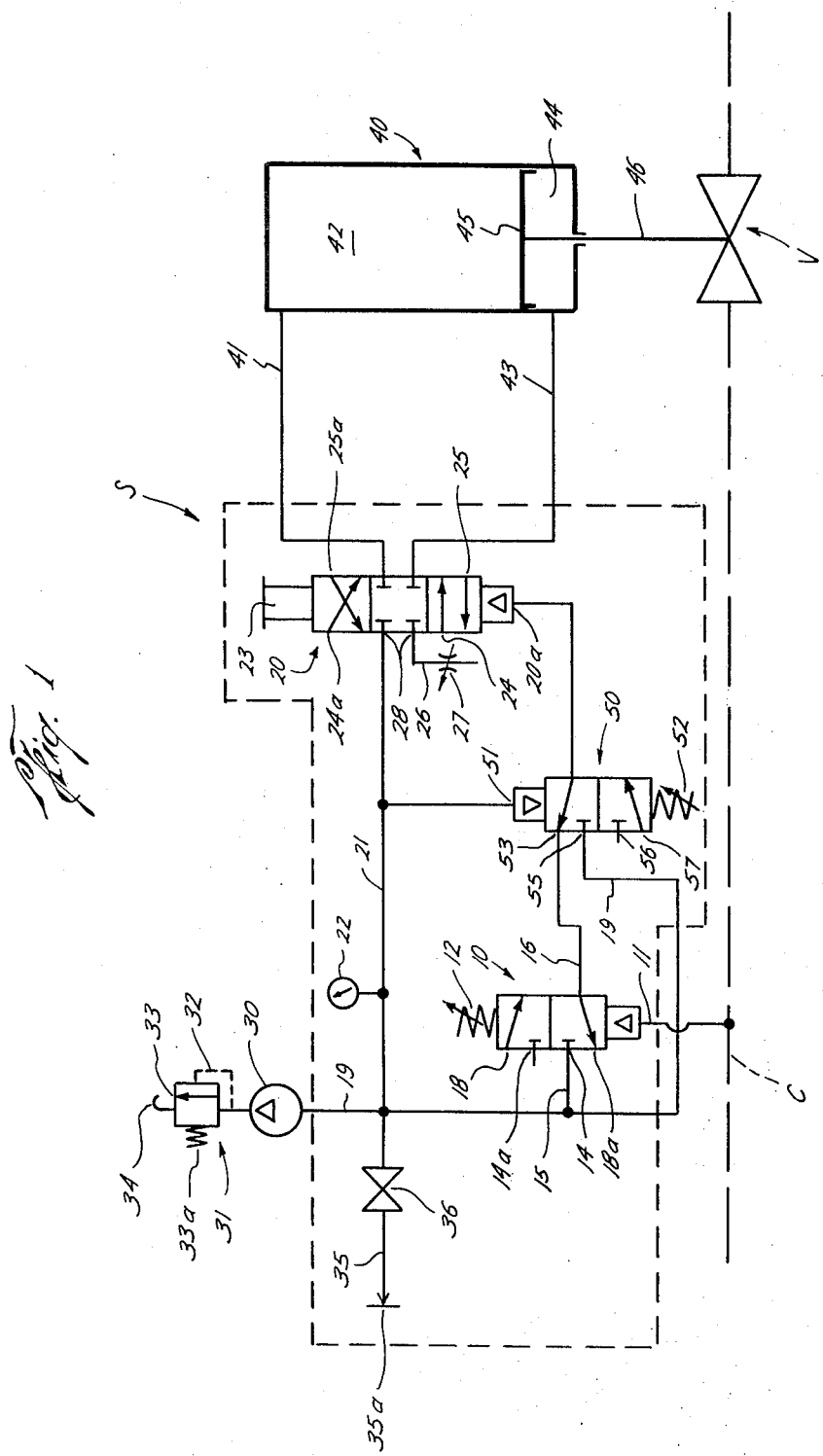
FIG. 1 is a schematic fluid power diagram of a preferred embodiment of the present invention.

In the drawings, the letter S designates generally the system of the present invention for operating a valve V in a fluid conduit C. The conduit C may be, for example, a pipeline carrying liquified petroleum gas, natural gas, or other petroleum product, while the valve V is a remote block valve at a remote location to be shut off when an abnormal condition occurs, such as a pressure drop, indicating a rupture in the pipeline, or a pressure increase. In the accompanying drawings, the various components of the system S are set forth in accordance with American National Standard ANS Y 32.10, "Graphic Symbols for Fluid Power Diagrams" and thus in a form well known and understandable to those of ordinary skill in the art.

The system S operates the valve V when the abnormal condition occurs in the fluid conduit C. The conduit C and valve V are conventional and are shown schematically, to preserve clarity in the drawings, since the structural details thereof are not part of the present invention.

A sensing valve 10 senses the abnormal condition in the fluid conduit C, which may be an increase or decrease in pressure in the conduit C, as set forth above, and permits a control valve 20 to apply fluid under pressure from a fluid power supply tank 30, having a self-contained supply of power fluid or operating fluid therein, to a valve actuator 40 in order to operate the valve V.

An inlet port 11 conducts fluid from the conduit C to the sensing valve 10. A spring 12 exerts a predetermined force on the sensing valve 10 opposing the pressure in the conduit C present in the inlet port 11 to sense a decrease in pressure in the conduit C. The force exerted by the spring 12 may be varied in accordance with the desired minimum safety pressure level to be monitored in the fluid conduit C.

The sensing valve 10 has two operating positions. In the first operating position (FIG. 1), an inlet port 14 blocks passage of fluid from a pressure inlet conduit 15. In this position, the sensing valve 10 vents an outlet conduit 16.

In the second operating position, pressure in the inlet port 11 has dropped to a level sufficiently less than the force exerted by the spring 12 so that the sensing valve 10 moves to the second operating position. In the second operating position, a passage port 18 provides fluid communication between the pressure inlet conduit 15 and the outlet conduit 16, for reasons to be more evident hereinbelow. The pressure inlet conduit 15 is in fluid communication with a supply conduit 19 connected to the self-contained fluid power supply tank 30.

When the sensing valve 10 is to sense an increase in pressure, an alternate inlet port 14a is connected to the conduit 15 blocking same when the valve is in the first operating position. When the pressure at the inlet port 11 exceeds the force of the spring 12, the valve 10 moves to a second operating position connecting the conduit 15 permitting fluid passage to the outlet conduit 16 through an alternate passage port 18a.

A supply conduit 21 provides fluid communication between the supply conduit 19 and the control valve 20. A pressure gauge 22 may be mounted to sense the pressure in the supply conduit 21, if desired. The control valve 20 has three operating positions: a forward flow position; a reverse flow position; and a blocking position. A manual reset operator 23 of the control valve 20 permits manual setting of the control valve 20 to any of the three positions. An inlet port 20a of the valve 20 responds to fluid pressure to move the valve 20 to the forward flow position, for reasons to be more evident hereinbelow.

In the forward flow position, an inlet port 24 of the control valve 20 permits passage of fluid from the supply conduit 21 to an outlet conduit 41. The outlet conduit 41 conveys the fluid from the supply conduit 21 to a first chamber 42 of the valve actuator 40. A return conduit 43 provides fluid communication between a second chamber 44 of the valve actuator 40 and an outlet vent 25 of the valve 20. A release conduit 26 having a flow control means 27 therewith provides venting or release of the fluid from the conduit 43 through the outlet vent 25.

In the blocking position (FIG. 1), blocking ports 28 of the control valve 20 prevent passage of fluid from the supply conduit 21 to the conduits 41 and 43 of the valve actuator 40.

In the reverse operating position, the control valve 20 reverses the flow of fluid from the supply conduit 21 to the valve actuator 40. A reverse inlet port 24a provides fluid communication between the supply conduit 21 and the conduit 43. A reverse outlet port 25a provides fluid communication between the conduit 41 and the release conduit 26, for reasons to be more evident hereinbelow.

The self-contained fluid power supply tank 30 contains a supply of operating fluid therein under pressure. The operating fluid may be a gas, such as nitrogen for ecology purposes, or a liquid pressurized by a gas. The tank 30 retains the fluid under pressure and provides a source of power to shut the valve V in the event of an abnormal pressure condition in the conduit C.

A release valve 31 in fluid communication through a sensing port 32 with the tank 30 senses the pressure in the tank 30 and moves to a release position permitting escape of excess pressure from the tank 30 in the event of a pressure surge or abnormal pressure condition therein. A Spring 33a exerts a force on the valve 31 to establish the pressure level for the release valve 31. An outlet conduit 34 provides for escape of such excess pressure from the release port 33, when the pressure in the tank 30 exceeds the force of the spring 33a.

An inlet conduit 35 provides fluid communication through a valve 36 to the tank 30. A quick-disconnect inlet 35a permits passage of the operating fluid into the conduit 35 in order that the tank 30 may receive operating fluid therein under pressure to provide the self-contained power supply for the system S. A servicing technician may periodically monitor each pumping or relay station having a valve V along the conduit C. If the gauge 22 indicates that the pressure in the system S is low, the tank 30 is re-charged through the inlet 35a to the desired level.

The valve actuator 40 includes a piston 45 separating the chambers 42 and 44 therein. The piston 45 moves within the valve actuator 40 changing the dimensions of the chambers 42 and 44 in response to the flow of fluid in the conduits 41 and 43 according to the position of the control valve 20, as will be more evident hereinbelow. A rod 46 is in operative connection with the piston 45 and responds to movement thereof to change the position of the valve V in accordance with movement of the piston 45.

A standby valve 50 of the system S activates the control valve 20 in response to a decrease in pressure in the power supply tank 30. An inlet port 51 of the valve 50 applies fluid pressure from the supply conduit 21 thereto. A spring 52 exerts a force on the valve 50 opposing the pressure at the inlet port 51. This force is a predetermined safety level so that the valve V may be shut before power from the tank 30 is lost, as will be set forth hereinbelow. The force exerted by the spring 52 may be varied to adjust the desired safety level for operation of the standby valve 50.

In the normal operating position (FIG. 1) a passage port 53 of the valve 50 provides fluid communication between the conduit 16 and an outlet conduit 54. In the normal operating position, a blocking port 55 is connected with the supply conduit 19, blocking passage of fluid from the conduit 19 to the conduit 54.

In the second operating position of the valve 50, the pressure at the inlet port 51 is reduced to a predetermined level insufficient to overcome the force exerted by the spring 52. A blocking port 56 is connected to the conduit 16 blocking the flow of fluid from the conduit 16. A standby port 57 is moved into communication with the supply conduit 19 and provides fluid communication between the supply conduit 19 and the conduit 54. The conduit 54 provides fluid communication between the standby valve 50 and the sensing valve 10 and the inlet port 20a of the control valve 20.

In the operation of the present invention, the power supply tank 30 at the remote pumping station is charged with pressurized operating fluid through the inlet 35 until a desired pressure level is obtained therein. The control valve 20 is moved by manual operator 23 to the reverse flow position, permitting the flow of operating fluid from the supply conduit 21 through the port 24a of the control valve 20 to the conduit 43. The fluid enters the chamber 44 of valve actuator 40, moving the piston 45 upwardly from the position shown in the accompanying drawings, opening the valve V in the conduit C.

The pressure gauge 22 is then examined, and the pressure in the tank 30 increased again to the desired operating level, if a pressure decrease has occurred during opening of the valve V. The control valve 20 is manually set to the blocking position (FIG. 1), and the system S is ready for operation.

In operation, the sensing valve 10 senses the pressure at inlet port 11. As long as the pressure is above the desired minimum safety level, the valve 10 blocks the flow of operating fluid from the inlet conduit 15 and supply conduit 19 at the port 14. In the event that pressure in the conduit C drops below the predetermined minimum level as established by the force in the spring 12, the spring 12 urges the sensing valve 10 to the second operating position.

In the second operating position, the valve 10 permits the flow of operating fluid from the inlet conduit 15 and supply conduit 19 through the passage port 18 and outlet conduit 16 to the inlet port 53 of the standby valve 50. The operating fluid flows through the standby valve 50 and the conduit 54 to the inlet port 20a of the control valve 20. Presence of operating fluid at the inlet port 20a of the control valve 20 moves the control valve 20 from the blocking position to the forward flow position, permitting the flow of operating fluid from the supply conduit 21 through the port 24 of valve 20 to the inlet conduit 41. The operating fluid in the conduit 41 enters the chamber 42 in the valve actuator 40 moving the piston 45 downwardly and reversing the position of the valve V, closing same. In this manner, the system A operates the valve V when an abnormal condition, as represented by a decrease in pressure, occurs in the fluid conduit C.

In the event of a leak or decrease in pressure in the power supply tank 30 or the supply conduits 21 or 19 or elsewhere in the system S, the standby valve 50 senses the decrease at the inlet port 51 thereof and the spring 52 moves the standby valve 50 to the second, or standby position. In the standby position, the standby port 57 of the valve 50 permits fluid from the supply conduit 19 to pass through the standby valve 50 to the inlet port 20a of the control valve 20, causing the control valve 20 to operate in the manner previously set forth and closing the valve V.

In this manner, the valve V is shut by the standby valve 50 due to a malfunction in the system S before pressure is lost from the power supply tank 30, and repair of the system S can be performed. At this time, flow in the conduit C is halted by the closed valve V. Thus, the standby valve 50 senses a malfunction in the system S and prevents the malfunction from going undetected. Further, since the standby valve 50 shuts the valve V on malfunction of the system S, an abnormal condition, such as a rupture of the conduit system C, occurring after malfunction of the system S, has reduced adverse consequences.

It should be noted that the control valve 20 is operated in response to the occurrence of a pressure drop in the conduit C or a pressure drop in the power supply tank 30. The valve 20 operates in response to whichever of the two events occurs first, causing the valve actuator 40 to operate the valve V and close same, indicating either an abnormal condition in the conduit C or a malfunction of the system S. At this time, a crew is sent in order that corrective action may be taken.

In an alternative system S-1 of the present invention (FIG. 2), like structure performing a like function to the structure of the system S bears like reference numerals. In the system S-1, the power supply tank 30 receives a suitable liquid such as hydraulic fluid therein through the inlet valve 36. A pressure gauge 38 is mounted with the tank 30 in the system S-1. The liquid in the tank 30 is maintained under pressure by means of a gas introduced through the inlet 36, working on a surface 30a of the hydraulic fluid in the tank 30. The pressure of the gas on the surface 30a, once stored in the tank 30, reduces the chance of foreign matter entering the hydraulic fluid. The gas in the tank 30 is supplied over the conduit 19 to the sensing valve 10 and other valves to be set forth hereinbelow.

An accumulator 70 receives pressurized gas through a quick-disconnect inlet 71 and check valve 72. The gas in the accumulator 70 exerts a force against a liquid-gas interface 70a to pressurize the liquid in the system S-1. The gas once stored in the accumulator 70 pressurizes the liquid in the system S-1 and further reduces the possibility of undesired matter such as particles or liquid entering the system S-1. The gas in the accumulator 70 is compressed by transfer of fluid from the tank 30 thereto so that operating energy is stored in the accumulator 70 to operate the system S. Other energy storing means such as springs may be used in place of the gas, if desired. A conduit 73 provides communication for the liquid in the accumulator 70 to the supply conduit 21.

A hydraulic filter 75 having a screen or other filter media 76 therein is mounted in the supply conduit 21 to filter the fluid in the system S-1 and remove particulate matter therefrom. A manually operable hydraulic pump 79 is mounted in the conduit 21 to reverse the operation of the valve V, as will be set forth hereinbelow. A shut-off valve 77 is mounted in the conduit 21 to provide an additional method of closing the valve V. The valve 77 serves to prevent back flow from the accumulator 70 into the tank 30 in the event of malfunction of the pump 79. A pair of inlet ports 78 are connected through check valve 78a to the supply conduit 21 in order that an external pump may be connected to the system S-1 during checkout and maintenance and for other reasons. A power supply return conduit 21a connects to the port 25a of control valve 20, so that low pressure fluid flowing from the outlet of piston 45 may return to the tank 30 during operation of valve actuator 40. A flow control valve 41a is mounted in the conduit 41, and a flow control valve 43a is mounted in the conduit 43 to control the speed of operation of valve actuator 40.

An accumulator standby valve 80 senses the pressure in the accumulator 70 and activates the control valve 20, in a manner to be set forth hereinbelow, in response to the decrease in pressure in the accumulator 70 of the power supply of the system S-1. An inlet port 81 is in fluid communication through a conduit 81a with the supply conduit 21. An adjustable spring 82 exerts a force resisting the pressure sensed at the inlet port 81.

The accumulator standby valve 80 has two operating positions. In the first operating position (FIG. 2), a blocking port 83 is connected through a conduit 84 to a supply conduit 19a. The supply conduit 19a is in communication with the supply conduit 19 and contains pressurized gas from the tank 30. In the first operating position, a passage port 85 of the standby valve 80 permits passage therethrough of fluid from the conduit 54 to a conduit 86. In the first operating position, the standby valve 80 provides a passage for fluid flow therethrough in the event that the standby valve 50 senses a pressure decrease in the tank 30, in the manner previously set forth.

In the event of a decrease in pressure in the accumulator 70 as conducted through the conduit 81a to the inlet port 81 of the accumulator standby valve 80, the accumulator standby valve 80 moves to the second operating position. In the second operating position, a passage valve 87 provides fluid communication between the conduits 84 and 86 and permits pressurized fluid from the supply conduit 19a to pass to the sensing valve 10.

The supply conduit 19a further supplies operating fluid to the inlet conduit 15 of the sensing valve 10 in order to provide operating fluid to the control valve 20 to operate the valve V, as has previously been set forth.

Figure 2:
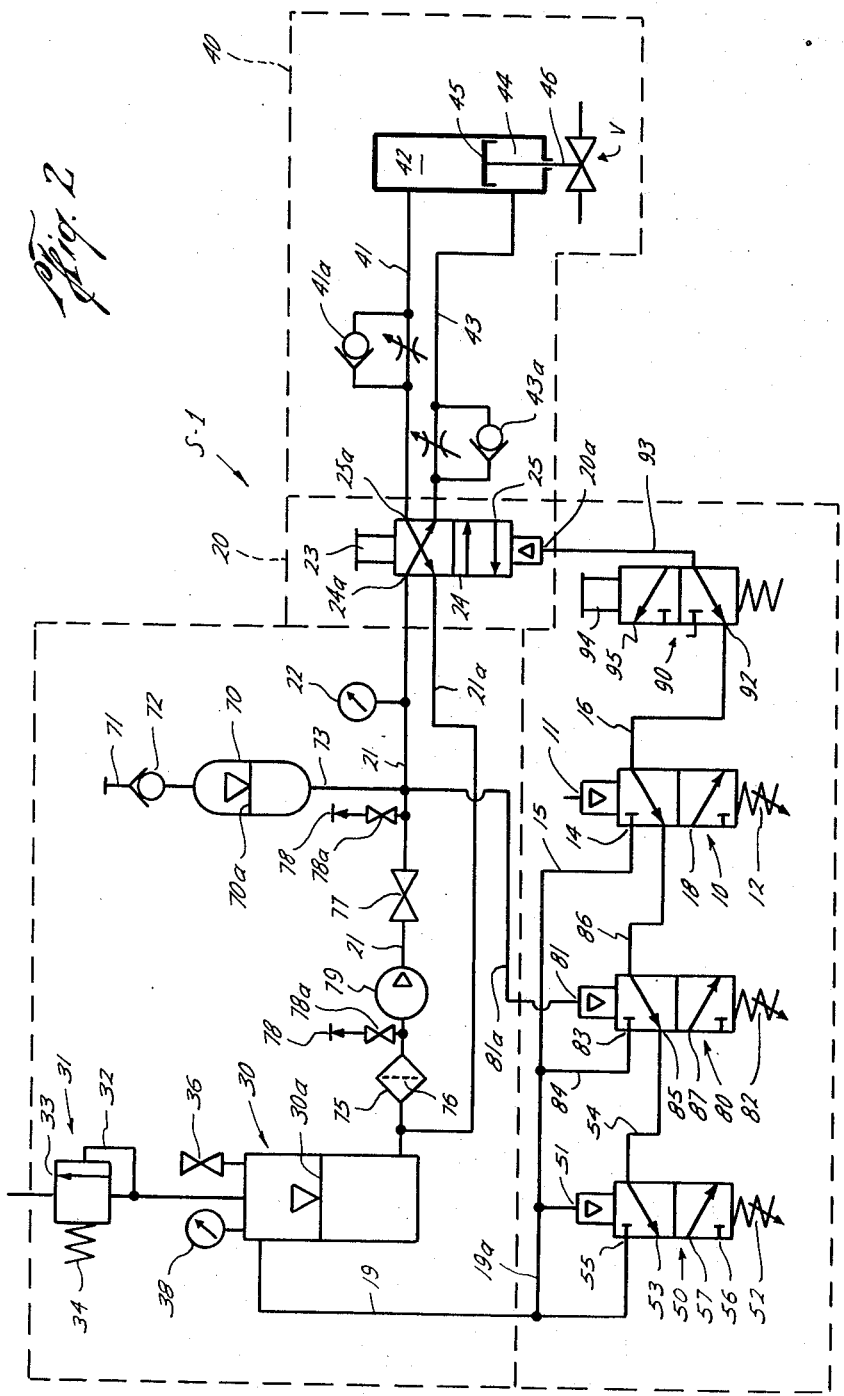
FIG. 2 is a schematic fluid power diagram of an alternative embodiment of the present invention.

A pilot valve 90 is normally biased by a spring 91 to a first operating position (FIG. 2). In this position, a passage port 92 permits fluid communication between the conduit 16 and a venting conduit 93 connected to the inlet port 20a of the control valve 20. A manual operator 94 permits movement of the pilot valve 90 from the first position to a second operating position, blocking flow of fluid from conduit 16 to venting conduit 93 and port 20a of valve 20. Valve 90 thus provides an additional means for locking out fluid flow from conduit 16 caused by low pressure in valve ports 11, 51 or 81 in order to permit opening of the valve V before restoration of normal pressure at the ports 17, 51, and 81.

In the operation of the system S-1, the tank 30 is charged with air or other gas through the inlet valve 36 to the desired operating pressure. The pump 79 is then operated to build the hydraulic pressure in the conduit 21 to the desired rated pressure. The control valve 20 is manually moved to the position shown (FIG. 2) permitting fluid to flow through the ports 24a and 25a to move the valve V to an open position by means of valve actuator 40, in the manner previously set forth. The pressure in the conduit 21 is increased by the pump 79 to the desired rated pressure. Once the valve V opens the system S-1 is ready for operation.

The system S-1 in operation maintains the valve V in the open position until one of four events occurs. When the first of these four events occurs, the system S-1 moves the valve V to a closed position closing the fluid conduit C stopping flow therethrough, notifying monitoring personnel.

The four events are: a decrease in pressure in the conduit C as sensed by the sensing valve 10 in the inlet port 11, in the manner previously set forth; a decrease in pressure in the supply conduit 19a as sensed by the standby valve 50, at the inlet port 51; a decrease in pressure in the accumulator 70, below a predetermined safety level as sensed at the inlet port 81 of the accumulator standby valve 80; or movement of the control valve 20 to an opposite position from that shown in the accompanying drawings by means of the operating arm 23.

A decrease in pressure in the fluid conduit C moves the control valve 10 to an opposite position, permitting fluid from the supply conduit 19a to flow through the sensing valve 10 and pilot valve 90 to the inlet port 20a of the control valve 20, operating same and closing the valve V in the manner previously set forth.

Decrease of pressure in the supply conduit 19a permits the standby valve 50 to move to an opposite position from that shown, permitting operating fluid to flow from conduit 19a through the port 57 of the valve 50 and through the accumulator standby valve 80, sensing valve 10, and pilot valve 90 to operate the control valve 20 and close the valve V.

Decrease of pressure in the accumulator 70 permits the accumulator standby valve 80 to move to an opposite position, permitting the flow of fluid from conduit 19a through the port 87 of accumulator standby valve 80 and through the sensing valve 10 and pilot valve 90 to operate the control valve 20.

Although the preferred embodiment of the invention has been set forth as a system for operating a valve, it is to be understood that within the scope of the present invention, a gate, damper, electrical switch gear or other mechanisms may be operated by the systems S and S-1 of the present invention.

It should be understood that other valves such as a two-position, four-way control valve or a five-ported, four-way control valve may be used to perform the control function of the valve 20 in response to fluid pressure at an inlet port thereof.

Further, a three-way control valve may be used as the control valve 20 when the valve actuator 40 is of the single-acting type.

The foregoing disclosure and description of the invention are illustrative and explanatory thereof, and various changes in the size, shape, and materials as well as in the details and structural components of the illustrated construction may be made without departing from the spirit of the invention.

We claim:

1. A system for operating a valve in a fluid conduit when an abnormal pressure condition occurs in the fluid conduit, comprising:
   a. sensing means for sensing the abnormal pressure condition in the fluid conduit;
   b. power supply means having an operating fluid therein under pressure;
   c. valve actuator means for operating the valve when operating fluid pressure from said power supply means is applied thereto;
   d. control means responsive to said sensing means for applying operating fluid pressure to said valve actuator means to operate the valve when the abnormal condition in the fluid conduit is sensed; and
   e. standby means for activating said control means in response to a loss of fluid pressure in said power supply means, said standby means comprising:
      1. means for sensing the operating fluid pressure in said power supply means;
      2. means for establishing a safety level for operation of said valve actuator means; and
      3. means for applying operating fluid pressure to said valve actuator means when the operating fluid pressure in said power supply means reaches said safety level, wherein a loss of fluid pressure in said power supply means and an abnormal pressure condition in the fluid conduit do not go undetected.

2. The structure of claim 1, wherein said power supply means comprises:
   a. tank means for storing a liquid; and
   b. accumulator means for storing fluid, said accumulator means having energy storage means therein for receiving pressurized fluid from said tank means for storing energy to operate the system.

3. The structure of claim 2, further including:
   a. means for applying fluid pressure to said valve actuator means in response to a decrease in pressure in said tank means; and
   b. means for applying fluid pressure to said valve actuator means in response to a decrease in pressure in said accumulator means.

4. The structure of claim 1, wherein said power supply means comprises:
   means for storing a gas under pressure.

5. The structure of claim 4, wherein said standby means comprises:
   means for applying fluid pressure to said valve actuator means in response to a decrease in pressure in said means for storing gas.

6. The structure of claim 1, wherein said power supply means comprises:
   tank means for storing a fluid.

7. The structure of claim 6, wherein said standby means comprises:
   means for applying fluid pressure to said valve actuator means in response to a decrease in pressure in said tank means.

8. The structure of claim 6, further including:
   relief means for releasing excess pressure from said tank means.

9. The structure of claim 1, further including:
   inlet means connected to said power supply means, wherein said power supply means may be recharged.

10. An apparatus for operating a mechanism in response to an abnormal condition in a fluid conduit comprising:
    a. sensing means for sensing the abnormal condition in the fluid conduit;
    b. power supply means having an operating fluid therein under pressure;
    c. actuator means for operating the mechanism when operating fluid pressure from said power supply means is applied thereto;
    d. control means responsive to said sensing means for applying fluid pressure to said actuator means to operate the mechanism when the abnormal condition is sensed; and
    e. standby means activating said control means in response to a malfunction in the system, said standby means comprising:
      1. means for sensing the operating fluid pressure in said power supply means;
      2. means for establishing a safety level for operation of said actuator means; and
      3. means for applying operating fluid pressure to said actuator means when the operating fluid pressure in said power supply means reaches said safety level, wherein a loss of fluid pressure in said power supply means and an abnormal condition in the fluid conduit do not go undetected.

* * * * *